United States Patent [19]

Henk et al.

[11] Patent Number: 4,990,615
[45] Date of Patent: Feb. 5, 1991

[54] TRIPHENDIOXAZINE AND TRIPHENDITHIAZINE DIRECT DYESTUFFS

[75] Inventors: Hermann Henk, Colonge; Wolfgang Harms; Peter Wild, both of Odenthal, all of Fed. Rep. of Germany

[73] Assignee: Bayer Aktiengesellschaft, Leverkusen, Fed. Rep. of Germany

[21] Appl. No.: 405,908

[22] Filed: Sep. 12, 1989

[30] Foreign Application Priority Data

Sep. 24, 1988 [DE] Fed. Rep. of Germany ....... 3832531

[51] Int. Cl.$^5$ ...................... C09B 19/00; C09B 19/02; C09B 21/00; D06P 1/40
[52] U.S. Cl. ......................... 544/76; 544/31; 544/32; 544/75; 544/77; 544/103; 544/99
[58] Field of Search ...................... 544/31, 32, 76, 77, 544/103

[56] References Cited

U.S. PATENT DOCUMENTS 3,009,913 11/1961 Pugin et al. ............... 544/77
3,883,523 5/1975 Parton ..................... 544/77 X
4,336,377 6/1982 Adam et al. ............... 544/76 X
4,874,857 10/1989 Harms .................... 544/75

FOREIGN PATENT DOCUMENTS 0134033 3/1985 European Pat. Off. ........... 544/31
2019872 11/1978 United Kingdom ............. 544/76

Primary Examiner—Floyd D. Higel
Attorney, Agent, or Firm—Sprung Horn Kramer & Woods

[57] ABSTRACT

Triphendioxazine and triphendithiazine direct dyestuffs of the formula

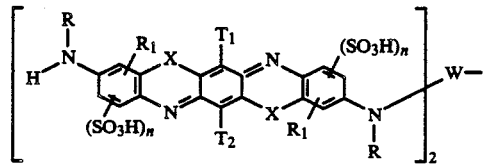

in which the substituents have the meanings given in the description produce on natural and synthetic OH— and NH— containing materials clear blue dyeings having good light and wet properties.

5 Claims, No Drawings

TRIPHENDIOXAZINE AND TRIPHENDITHIAZINE DIRECT DYESTUFFS

The invention relates to novel triphendioxazine and triphendithiazine direct dyestuffs of the formula

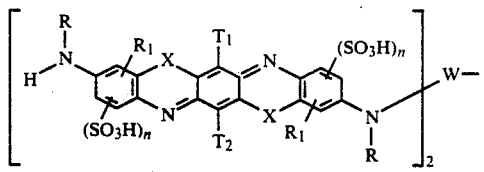
(I)

in which
R is H, substituted or unsubstituted $C_1$-$C_4$-alkyl,
$R_1$ is H, or a substituent
$T_1$, $T_2$ are H, Cl, Br, substituted or unsubstituted $C_1$-$C_4$-alkyl, $C_1$-$C_4$-alkoxy, phenyl, phenoxy,
n is 0, 1, 2,
W is a bridge member and
X is oxygen or sulphur.

Examples of R are: —H, —$CH_3$, —$C_2H_5$, n—$C_3H_7$, i—$C_3H_7$, n—$C_4H_9$, i—$C_4H_9$, which can be substituted, for example, by —OH, —$OCH_3$, —$OC_2H_5$, —COOH, —$SO_3H$, —O—$SO_3H$, —CN, or —Cl. Suitable substituents $R_1$ are: —$CH_3$, —$C_2H_5$, —Cl, —$OCH_3$, —$OC_2H_5$, or —COOH.

Examples of substituents of the substituted or unsubstituted $C_1$-$C_4$-alkyl and $C_1$-$C_4$-alkoxy radicals $T_1$ and $T_2$ are: —$OCH_3$, $OC_2H_5$, —O—$SO_3H$.

Examples of substituents of the substituted or unsubstituted phenyl and phenoxy radicals $T_1$ and $T_2$ are: —Cl, —Br, —$CH_3$, —$C_2H_5$, —$OCH_3$, —$OC_2H_5$.

Examples of suitable bridge members W are —CO— and radicals of aliphatic-conjugated, aromatic-carbocyclic or aromatic-heterocyclic dicarboxylic acids.

Examples of W which are suitable are:

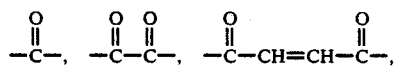

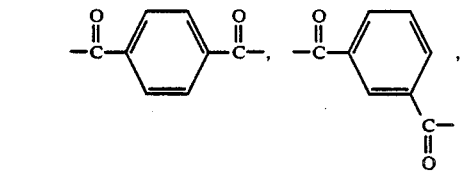

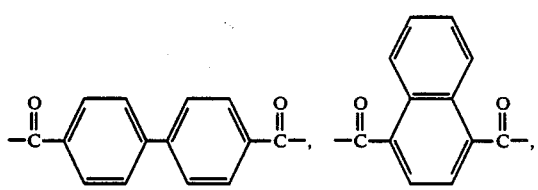

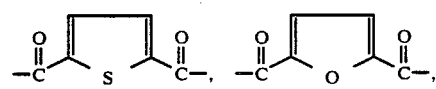

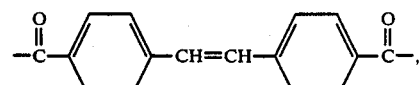

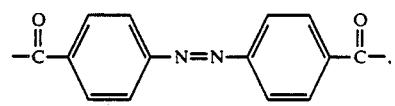

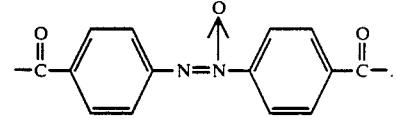

Preferred dyestuffs are those in which X is O.
Particular preference is given to dyestuffs of the formula (I) in which
R is H,
$R_1$ is H,
$T_1$, $T_2$ are Cl,
n is 1,
X is —O— and
W has the abovementioned meaning, in particular those in which W is —CO—.

The invention further relates to a process for the preparation of the dyestuffs of the general formula (I). It is characterized in that a triphendioxazine or triphendithiazine dyestuff of the formula

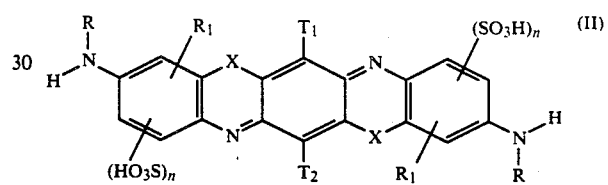
(II)

is reacted with phosgene or oxalyl chloride or the dihalides of aliphatic-conjugated, aromatic-carbocyclic or aromatic-heterocyclic dicarboxylic acids in a molar ratio of 2:1 with the elimination of 2 mol of hydrohalic acid.

The reaction is preferably carried out in the presence of equivalent amounts of basic compounds, preferably alkali metal hydroxides, oxides, carbonates or bicarbonates or alkaline earth metal hydroxides, oxides, carbonates or bicarbonates, or tertiary organic nitrogen bases, in particular aliphatic amines such as trialkanolamines, dialkylalkanolamines or alkyldialkanolamines or aromatic nitrogen bases such as pyridine, picolines and quinoline.

Examples of suitable basic compounds are lithium hydroxide, oxide, carbonate or bicarbonate, sodium hydroxide, oxide, carbonate or bicarbonate, potassium hydroxide, oxide, carbonate or bicarbonate, magnesium hydroxide, oxide, carbonate or bicarbonate calcium hydroxide, oxide, carbonate or bicarbonate, triethanolamine, methyldiethanolamine, dimethylethanolamine and reaction products of ammonia with more than 3 mol of ethylene oxide or propylene oxide.

Dyestuffs of the formula (I) in which W is the radical of a diarylazo- or diarylazoxy-dicarboxylic acid can also be prepared in the following manner:

(II) is first acylated in a molar ratio of 1:1 with a nitroarylcarbonyl halide and then reduced by methods known per se, for example by means of sugar.

The starting compounds (II), in particular including those given in the examples, are known (cf., for example, DE-A No. 2,124,080, Example 1; DE-A No.

3,423,581, Example 1 a and 1 (b) or can be prepared analogously to the processes described there.

The novel dyestuffs produce on natural and synthetic OH— and NH—containing materials such as cotton, paper, leather, polyamide clear blue dyeings which are distinguished by a high colour strength and good light and wet fastness properties.

EXAMPLE 1

110 parts of the triphendioxazine dyestuff of the formula

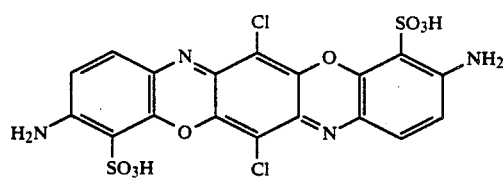

are dissolved in about 4 liters of water under neutral conditions. About 400 parts of phosgene are then introduced into this solution at room temperature over a period of several hours with vigorous stirring. At the same time, the pH of the reaction mixture is kept neutral by addition of a lithium hydroxide solution. To complete the reaction, it is advantageous to increase the temperature to about 80° C. The mixture is then stirred in the cold, and the precipitated dyestuff is filtered off, dried and ground. This gives 280 parts of a dark dyestuff powder, which is soluble in water in a clear blue colour and produces on cellulose materials brilliant blue direct dyeings having very high fastness properties.

In the form of the free acid, the dyestuff conforms to the following formula:

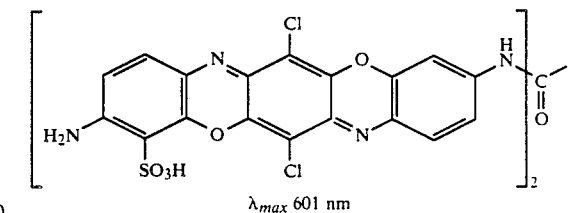

$\lambda_{max}$ 601 nm

Further interesting brilliant blue dyestuffs are obtained by replacing phosgene with the acid halides listed in the table below.

TABLE I

| Ex. | Acid halide | $k_{max}$ [nm] |
|---|---|---|
| 2 | Cl—CO—CO—Cl | 592 |
| 3 | Cl—CO—CH=CH—CO—Cl | 594 |
| 4 | Cl—CO—⟨C₆H₄⟩—CO—Cl | 590 |
| 5 | Cl—CO—⟨C₆H₄—C₆H₄⟩—CO—Cl | 590 |
| 6 | Cl—CO—⟨thiophene⟩—CO—Cl | |
| 7 | Cl—CO—⟨furan⟩—CO—Cl | |
| 8 | Cl—CO—⟨C₆H₄⟩—CH=CH—⟨C₆H₄⟩—CO—Cl | 592 |

We claim:
1. A triphendioxazine or triphendithiazine direct dyestuff of the formula

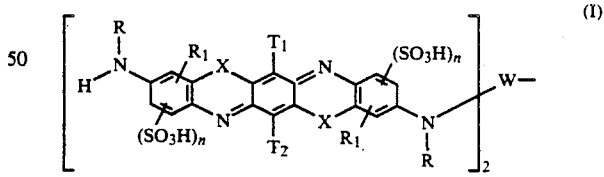
(I)

in which
R is H, unsubstituted $C_1$-$C_4$-alkyl or $C_1$-$C_4$-alkyl substituted by —CH$_3$, —C$_2$H$_5$, —Cl, —OCH$_3$, —OC$_2$H$_5$- or —COOH,
R$_1$ is H, CH$_3$, C$_2$H$_5$, Cl, OCH$_3$, OC$_2$H$_5$ or COOH,
T$_1$, T$_2$ are H; Cl; Br; unsubstituted $C_1$-$C_4$-alkyl, unsubstituted C-$C_4$-alkoxy; $C_1$-$C_4$-alkyl or $C_1$-$C_4$-alkoxy substituted by OCH$_3$, OC$_2$H$_5$ or O—SO$_3$H; phenyl; phenoxy; or phenyl or phenoxy substituted by Cl, Br, CH$_3$, C$_2$H$_5$, OCH$_3$ or OC$_2$H$_5$,
n is 0, 1, 2,
W is a bridge member and
X is oxygen or sulphur.

2. A dyestuff according to claim 1 in which is oxygen.
3. A dyestuff according to claim 1 in which
$R_1$ and $R_2$ are H
$T_1$ and $T_2$ are Cl,
n is 1, and
X is O.
4. A dyestuff according to claim 3 in which W is
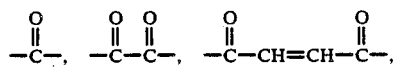
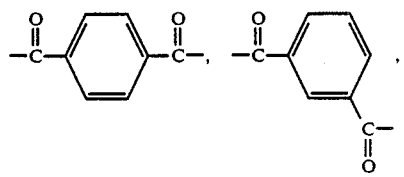
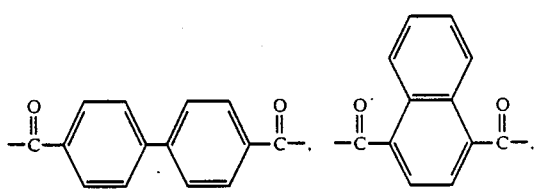
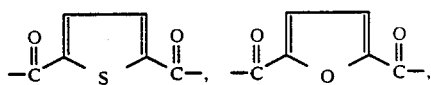
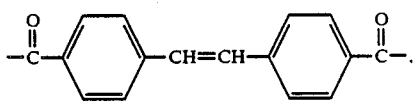
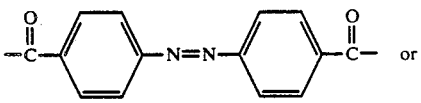
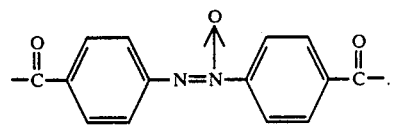
5. A dyestuff according to claim 3 in which W is —CO—.
* * * * *

UNITED STATES PATENT AND TRADEMARK OFFICE
CERTIFICATE OF CORRECTION

PATENT NO. : 4,990,615

DATED : February 5, 1991

INVENTOR(S) : Henk et al.

It is certified that error appears in the above-identified patent and that said Letters Patent is hereby corrected as shown below:

Col. 5, line 1   After " in which " insert -- X --

Signed and Sealed this

Twelfth Day of October, 1993

Attest:

BRUCE LEHMAN

*Attesting Officer*   *Commissioner of Patents and Trademarks*